(12) United States Patent
Kim (10) Patent No.: US 9,783,247 B2
(45) Date of Patent: Oct. 10, 2017

(54) AERODYNAMIC CONTROL SYSTEM FOR VEHICLES

(71) Applicant: Hyundai Motor Company, Seoul (KR)

(72) Inventor: Hak Lim Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/960,782

(22) Filed: Dec. 7, 2015

(65) Prior Publication Data

US 2017/0050684 A1    Feb. 23, 2017

(30) Foreign Application Priority Data

Aug. 20, 2015  (KR) .......... 10-2015-0117057

(51) Int. Cl.
  *B60J 9/00*    (2006.01)
  *B62D 35/00*   (2006.01)
  *B62D 35/02*   (2006.01)

(52) U.S. Cl.
  CPC .......... *B62D 35/007* (2013.01); *B62D 35/02* (2013.01)

(58) Field of Classification Search
  CPC .. B01D 21/2433; B01D 21/245; B62D 35/00; B62D 1/28; B62D 35/007; B62D 35/02; B60K 11/085; B60Y 2306/01; B60P 3/08; G07B 15/063; G01S 13/931; G01C 21/28
  USPC ...................................... 296/180.5
  See application file for complete search history.

(56) References Cited

U.S. PATENT DOCUMENTS

| | | | | | |
|---|---|---|---|---|---|
| 1,923,349 | A | * | 8/1933 | Wolverton | A45D 44/12 105/1.2 |
| 2,037,942 | A | * | 4/1936 | Stalker | B62D 35/00 180/313 |
| 2,199,883 | A | * | 5/1940 | Zenzo | B60S 1/62 180/313 |
| 5,823,610 | A | * | 10/1998 | Ryan | B62D 35/004 296/180.4 |

(Continued)

FOREIGN PATENT DOCUMENTS

JP    07-304472    11/1995
JP    08-5111    2/1996

(Continued)

OTHER PUBLICATIONS

Kim et al., "Development of Active Aero-Devices on Vehicle Underbody for improvement in Aerodynamic Performance.", KSAE15-B0237, pp. 663-669.

*Primary Examiner* — Kiran B Patel
(74) *Attorney, Agent, or Firm* — Mintz Levin Cohn Ferris Glovsky and Popeo, P.C.; Peter F. Corless (57) ABSTRACT

An aerodynamic control system for vehicles may improve aerodynamic performance of a vehicle and enhance fuel efficiency and driving stability of the vehicle. The aerodynamic control system includes a diffuser combined with a rear bumper at an ascending position so as to constitute part of a bumper surface of the rear bumper and separated from the rear bumper at a descending position so as to pass air exhausted from a lower part of the vehicle to a rear part of the vehicle along upper and lower surfaces of the diffuser, and a diffuser driving unit that connects a vehicle frame panel in a front of the rear bumper to the diffuser, supporting the diffuser on the vehicle frame panel, and adjusting upward and downward movement of the diffuser and the angle of the diffuser.

11 Claims, 10 Drawing Sheets

[ PRIOR TO OPERATION OF DIFFUSER ]

[ AFTER OPERATION OF DIFFUSER ]

(56) References Cited

U.S. PATENT DOCUMENTS

| | | | | |
|---|---|---|---|---|
| 6,196,620 B1* | 3/2001 | Haraway, Jr. | ........ | B62D 35/007 180/903 |
| 6,286,893 B1* | 9/2001 | Presley | ................ | B62D 35/005 296/180.5 |
| 7,775,582 B2* | 8/2010 | Browne | ............... | B62D 35/005 296/180.1 |
| 8,360,508 B2* | 1/2013 | Ilse | ........................ | B62D 25/06 296/180.1 |
| 8,366,178 B2* | 2/2013 | Yamagishi | ............. | B62D 35/02 180/903 |
| 8,926,000 B2* | 1/2015 | Del Gaizo | ............. | B62D 35/02 296/180.5 |
| 9,150,261 B2* | 10/2015 | DeAngelis | ............. | B62D 35/02 |
| 9,156,508 B2* | 10/2015 | Yamaguchi | .......... | B62D 35/007 |
| 9,199,674 B2* | 12/2015 | Wolf | ...................... | B60K 11/08 |
| 9,283,999 B2* | 3/2016 | Wolf | ...................... | B62D 35/007 |
| 9,352,792 B2* | 5/2016 | Ito | .......................... | B62D 35/02 |
| 9,403,564 B1* | 8/2016 | Al-Huwaider | ....... | B62D 35/007 |
| 9,440,521 B2* | 9/2016 | Konishi | .................... | B60J 7/22 |
| 9,440,689 B1* | 9/2016 | Smith | .................... | B62D 35/02 |
| 9,469,354 B1* | 10/2016 | Ciccone | ............... | B62D 35/005 |
| 9,499,217 B2* | 11/2016 | Jeong | .................... | B62D 35/007 |
| 2005/0040637 A1* | 2/2005 | Wood | .................... | B62D 25/168 280/768 |
| 2009/0085371 A1* | 4/2009 | Nagahama | ............. | B62D 37/02 296/180.5 |
| 2009/0115221 A1* | 5/2009 | Shinedling | ............. | B62D 37/02 296/180.5 |
| 2015/0353149 A1* | 12/2015 | Wolf | .................... | B62D 35/007 296/180.5 |

FOREIGN PATENT DOCUMENTS

| | | |
|---|---|---|
| JP | 08-239062 | 9/1996 |
| JP | 3052725 | 7/1998 |
| JP | 3952063 | 5/2007 |
| JP | 2008-168843 A | 7/2008 |
| KR | 10-1490605 B1 | 2/2015 |
| KR | 10-1526735 B1 | 6/2015 |

\* cited by examiner

FIG. 1

(RELATED ART)

FIG. 2

(RELATED ART)

FIG. 3

(RELATED ART)

[ PRIOR TO OPERATION OF DIFFUSER]

FIG. 4A

[ AFTER OPERATION OF DIFFUSER ]

AERODYNAMIC CONTROL SYSTEM FOR VEHICLES

CROSS-REFERENCE TO RELATED APPLICATION

This application claims under 35 U.S.C. §119(a) the benefit of Korean Patent Application No. 10-2015-0117057 filed on Aug. 20, 2015, the entire contents of which are incorporated herein by reference.

BACKGROUND (a) Technical Field

The present invention relates to an aerodynamic control system for vehicles, more particularly, to an aerodynamic control system for vehicles which may improve aerodynamic performance of a traveling vehicle and increase fuel efficiency and driving stability of the vehicle.

(b) Description of the Related Art

As is generally known, when a vehicle is in motion, a front part of a vehicle frame pushes air in the upward, downward, leftward and rightward directions, and the pushed air moves to the rear part of the vehicle frame and returns to its original position.

It takes a period of time for such air to return to its original position and, as the time increases, a vacuum region formed at a rear part of the vehicle increases.

Here, the generated vacuum pulls the vehicle frame at the back, and thus the vehicle meets with air resistance. Further, a lift, in which the vehicle is lifted when the vehicle travels at a high speed, is generated due to a vortex generated by the vacuum.

In order to prevent such a lift, driving stability needs to be achieved when the vehicle travels at a high speed through wake control to improve aerodynamic performance and vortex control at the rear part of the vehicle.

In order to improve aerodynamic performance of the vehicle, wake control is very important. In order to make a wake state which is advantageous in aerodynamic performance during driving of the vehicle, air introduced into a lower part of the vehicle should be efficiently exhausted to the rear part of the vehicle through a lower part of a rear bumper or a lower end of the rear bumper.

In order to control the wake of the vehicle, the ground clearance of the lower end of the rear bumper may be increased, a slit hole may be applied to the lower end of the rear bumper, and a diffuser may be applied to a rear end of the vehicle frame so as to improve a flow diffusion angle.

Figure 1:
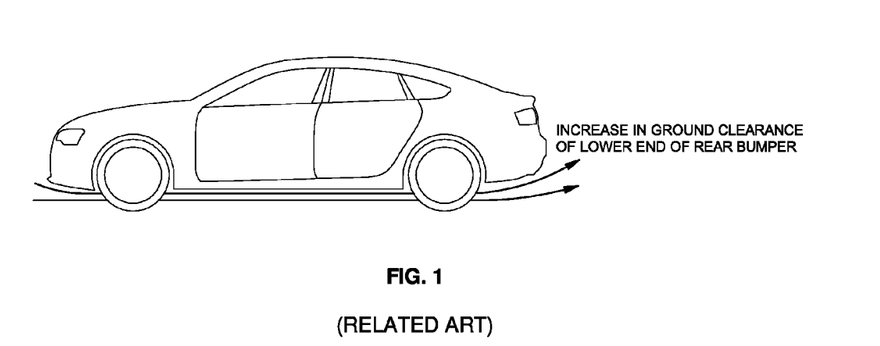
FIG. 1 (RELATED ART) is a schematic view illustrating an air flow state of a lower part of a vehicle to improve aerodynamic performance of the vehicle.

FIG. 1 (RELATED ART) is a view illustrating an air flow state of the lower part of a vehicle to improve aerodynamic performance of the vehicle. As exemplarily shown in FIG. 1, air introduced into the lower part of the vehicle may be smoothly exhausted in the backward direction by increasing the ground clearance of the lower end of a rear bumper, and an air flow diffusion angle at the rear end of a vehicle frame may be increased through increase in the ground clearance, thereby improving a wake.

However, an increase in the ground clearance of the lower end of the rear bumper causes a large region of the lower part of the vehicle frame to be exposed from a rear position of the vehicle and is thus disadvantageous in terms of the exposure (visible amount) of the lower part of the vehicle.

Figure 2:
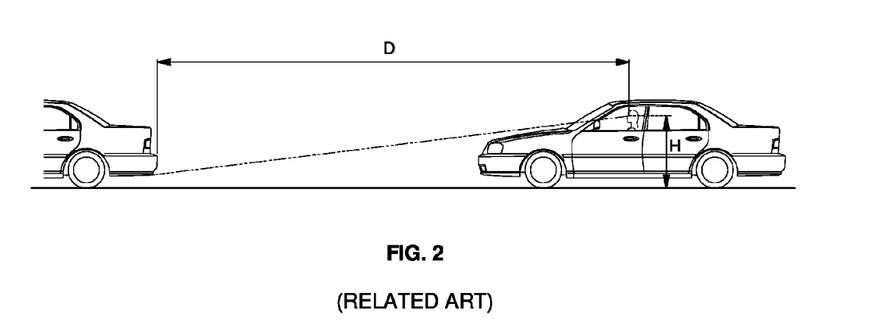
FIG. 2 (RELATED ART) is a schematic view illustrating a visible amount of the lower part of the vehicle.

Therefore, vehicle manufacturers set up a standard to minimize the visible amount of the lower part of a vehicle at a driver's eye height H of a rear vehicle, as exemplarily shown in FIG. 2 (RELATED ART), and an increase in the ground clearance of the lower end of the rear bumper is limited in improving aerodynamic performance of the vehicle due to increase in the visible amount of the lower part of the vehicle and design limitations.

Figure 3:
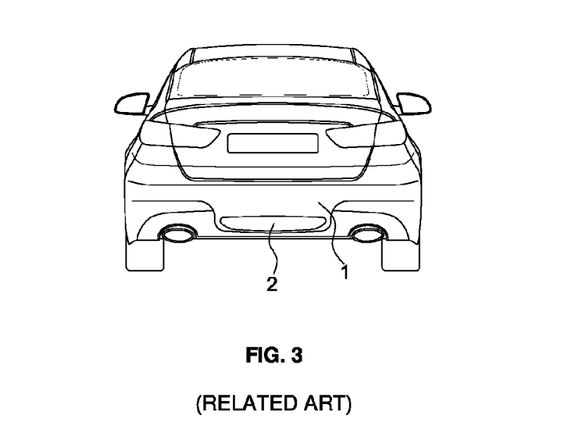
FIG. 3 (RELATED ART) is a schematic view illustrating an example of conventional technology in which a slit-shaped hole is applied to a lower end of a rear bumper.

FIG. 3 (RELATED ART) is a view illustrating an example in which a slit-shaped hole 2 is applied to the lower end of a rear bumper. As exemplarily shown in FIG. 3, if the slit-shaped hole 2 is formed at the lower end of a rear bumper 1, air introduced into the lower part of a vehicle may be smoothly exhausted to an area in the rear of the vehicle through the hole 2.

Application of such a hole 2 is advantageous in terms of the visible amount of the lower part of the vehicle and advantageous in terms of production costs, as compared to installation of a diffuser. However, since the hole 2 is always visible, application of the hole 2 is disadvantageous in terms of vehicle design, and the effect on aerodynamic performance generated by the hole 2 is minimal.

Further, in the case of a flap-type active rear diffuser, when a vehicle travels at a high speed, a flow diffusion angle may be controlled according to operation of a diffuser flap at the lower end of a rear bumper, but the diffuser flap moves based on the lower end surface of a conventional bumper, and thus an increase in the flow diffusion angle is restricted.

SUMMARY

The present invention provides an aerodynamic control system for vehicles which may improve aerodynamic performance of a vehicle, without increasing the visible amount of the lower part of the vehicle or limiting design of the vehicle, and can enhance fuel efficiency and driving stability of the vehicle.

It is another object of the present invention to provide an aerodynamic control system for vehicles which is provided at a lower end of a rear bumper so as to control a flow diffusion angle of exhausted air and an air flow exhaust amount according to a driving state of a vehicle, and may thus efficiently exhaust air introduced into a lower part of the vehicle to a rear part of the vehicle, and optimally control a wake of the traveling vehicle.

In one aspect, the present invention provides an aerodynamic control system for a vehicle including a diffuser being a panel-shaped member configured so as to be completely separated from or combined with a rear bumper of the vehicle, combined with the rear bumper at an ascending position so as to constitute a part of a bumper surface of the rear bumper, and separated from the rear bumper at a descending position so as to pass air exhausted from the lower part of the vehicle to the rear part of the vehicle along upper and lower surfaces of the diffuser, and a diffuser driving unit configured so as to connect a vehicle frame panel in a front of the rear bumper to the diffuser, supporting the diffuser on the vehicle frame panel, and adjusting upward and downward movement of the diffuser and an angle of the diffuser.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 7(a) to 8(c) are views illustrating the operating state of the aerodynamic control system for vehicles in accordance with the embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an aerodynamic control system for vehicles which may improve aerodynamic performance of a traveling vehicle and enhance fuel efficiency and driving stability of the vehicle.

For this purpose, the aerodynamic control system in accordance with the present invention includes a rear diffuser integrated with a rear bumper to form a bumper surface, and the rear diffuser forming the bumper surface at an ascending position during stopping or driving of a vehicle (at a low or medium speed) descends during driving of the vehicle at a high speed, at which air resistance is increased, so as to be controlled to various angles.

Further, in the present invention, a diffuser driving unit (including dual cylinder devices which will be described later) is driven so as to control the descending amount and angle of the rear diffuser according to the driving state of the vehicle, thereby optimizing an air flow diffusion angle and a flow exhaust amount at the rear part of the vehicle and improving aerodynamic performance of the vehicle.

Figure 4A:
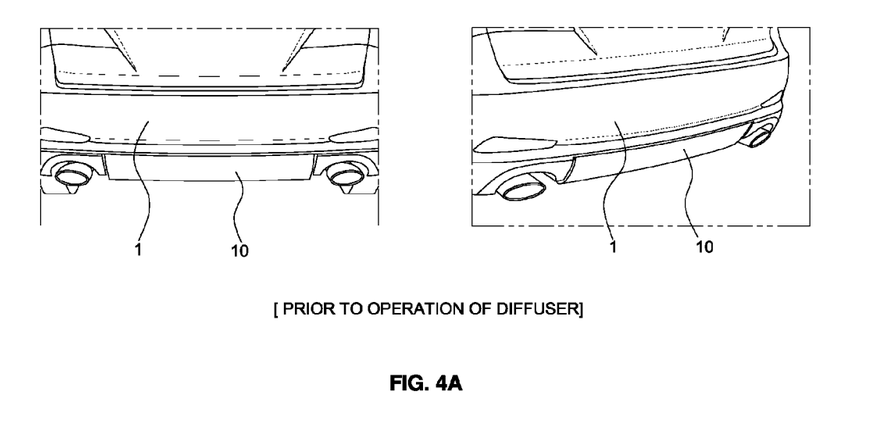
FIGS. 4A and 4B are views illustrating states of an aerodynamic control system for vehicles in accordance with an exemplary embodiment of the present invention prior to operation of a diffuser and after operation of the diffuser.
Figure 4B:
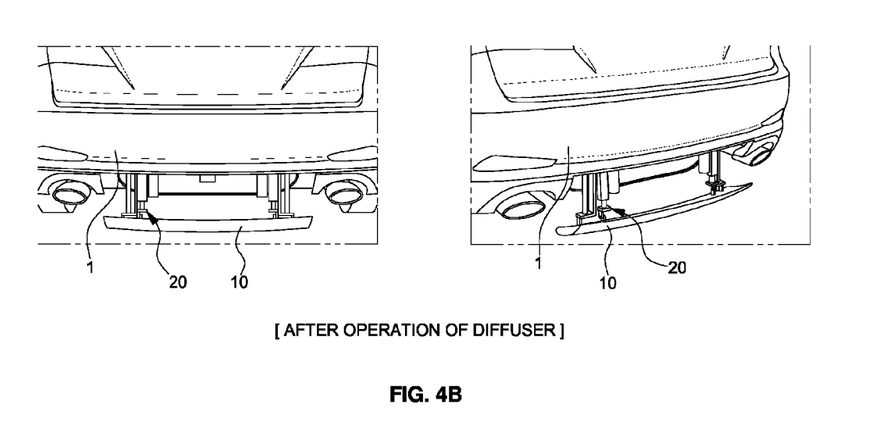

FIGS. 4A and 4B are views illustrating states of an aerodynamic control system for vehicles in accordance with an exemplary embodiment of the present invention prior to and after operation of a diffuser 10. In each of FIGS. 4A and 4B, a front view is provided to illustrate the diffuser 10 and a rear bumper 1, and a perspective view is provided to illustrate the diffuser 10 and the rear bumper 1.

First, the aerodynamic control system for vehicles in accordance with an exemplary embodiment of the present invention includes a rear bumper-integrated active diffuser 10 which is integrated with a rear bumper 1 at a position prior to operation, forms a bumper surface as a part of the rear bumper 1, and descends according to the driving state of a vehicle so that the vertical height and angle of the diffuser 10 are controlled.

Here, rear bumper integration does not mean that the diffuser 10 is mechanically and physically combined with the rear bumper 1, but means that the diffuser 10 at the ascending position is placed at the position of the bumper surface of the rear bumper 1 and thus forms a part of the bumper surface.

That is, in the present invention, the diffuser 10 may become part of the rear bumper 1, more particularly, part of a bumper cover. In a state of the diffuser 10 prior to operation (the maximally ascending state of the diffuser 10), the diffuser 10 becomes part of the bumper cover and thus forms the bumper surface and, at this time, the outer surface of the bumper cover of the rear bumper 1 and the outer surface of the diffuser 10 form one bumper surface at the rear part of a vehicle frame.

Further, the diffuser 10 is a panel member which, at such an ascending position, forms part of the bumper surface of the rear bumper 1 but, in a descending state, may be structurally spaced from the rear bumper 1 and completely separated from the rear bumper 1.

The diffuser 10 has a long panel shape extending leftwards and rightwards in the length direction of the rear bumper 1 and, at the maximally ascending position, is combined with the rear bumper 1 and forms the lower surface of the rear bumper 1.

The diffuser 10 is not mounted directly on the rear bumper 1 or the vehicle frame, but is supported by a vehicle frame panel 3 (in FIG. 5) within the rear bumper 1, i.e., a panel at the rear end of the vehicle frame, the rear bumper 1 being disposed in the rear of the rear end of the vehicle frame, via dual cylinder devices 21 (in FIG. 5) of a diffuser driving unit 20 (in FIG. 5), and the vertical position and angle of the diffuser 10 are controlled by operation of the dual cylinder devices 21.

For example, when the vehicle is stopped or travels at a low speed, which is a reference speed or lower, or a medium speed, the diffuser 10 at the ascending position forms the bumper surface, as exemplarily shown in FIG. 4A illustrating the state of the diffuser 10 prior to operation, and, when the vehicle travels at a high speed exceeding the reference speed, the diffuser 10 descends by the diffuser driving unit, as exemplarily shown in FIG. 4B, so as to assure the optimal flow diffusion angle and flow exhaust amount to effectively exhaust air introduced into the lower part of the vehicle towards the rear part of the vehicle and to optimize aerodynamic performance of the vehicle.

As described above, prior to operation, the diffuser forms the bumper surface of the rear bumper and thus deterioration of the design and external appearance of the vehicle due to the diffuser is not generated, and unnecessary increase in the ground clearance of the lower end of the rear bumper to optimize the wake and aerodynamic performance of the vehicle is not required, and thus an increase of the visible amount of the lower part of the vehicle and deterioration of the commercial value of the vehicle are not generated.

Further, since the diffuser is used as a bumper member to constitute part of the bumper surface of the rear bumper and used as a device to control the wake of the vehicle, using the diffuser has advantages, such as reduction of weight and production costs, as compared to using a separate under cover.

Further, since the diffuser forming part of the bumper surface of the rear bumper is not rotatably hinged directly to the rear bumper or the vehicle frame panel, but is installed as an operating member independently of the rear bumper and the vehicle frame panel so as to be vertically movable and controllable in terms of angle, the diffuser may assure a wide range of position and angle control. Moreover, since air introduced into the lower part of the vehicle frame passes through the upper and lower surfaces of the diffuser, flow diffusion with respect to flux passing through the diffuser is increased (excellent aerodynamic performance improvement effects).

Figure 5:
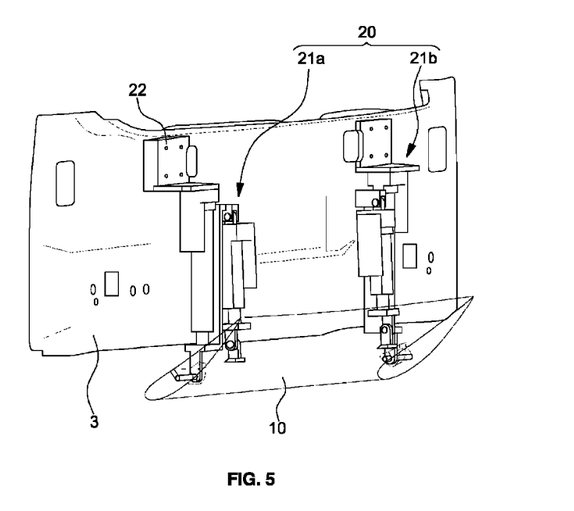
FIG. 5 is a perspective view illustrating the configuration of the aerodynamic control system for vehicles in accordance with the embodiment of the present invention.
Figure 6A:
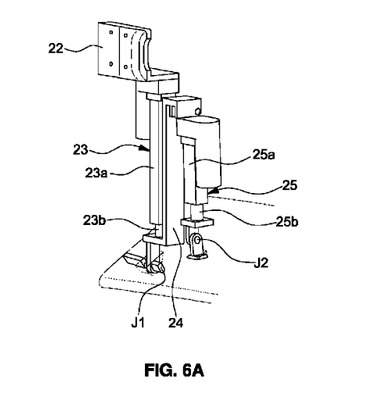
FIGS. 6(a) and 6(b) are perspective views illustrating the configuration and operating state of a dual cylinder device in the aerodynamic control system for vehicles in accordance with the embodiment of the present invention.
Figure 6B:
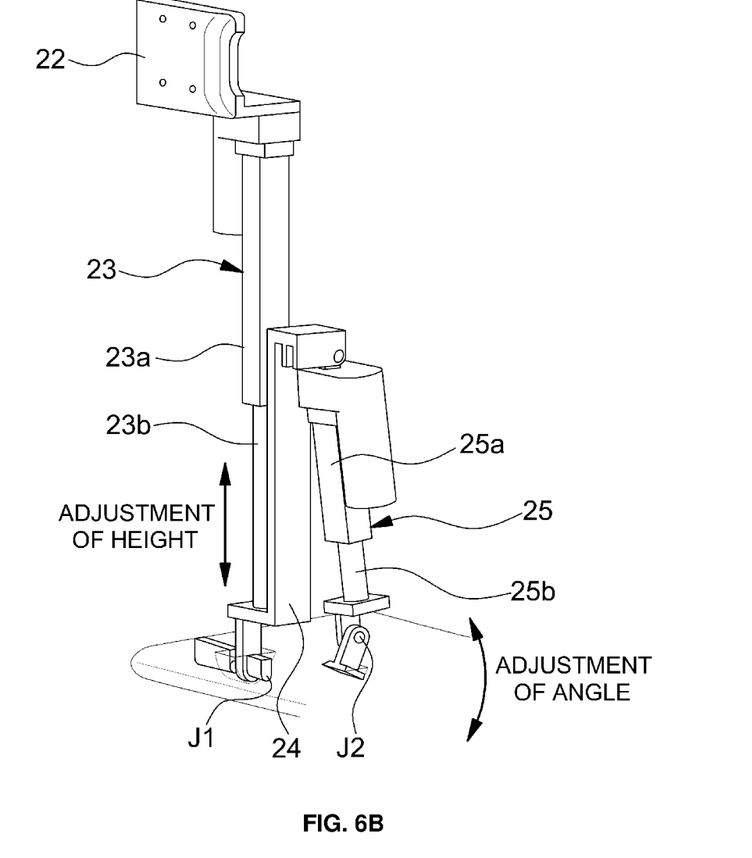

FIG. 5 is a perspective view illustrating the configuration of the aerodynamic control system for vehicles in accordance with the embodiment of the present invention and FIGS. 6(a) and 6(b) are perspective views illustrating the configuration and operating state of the dual cylinder device in the aerodynamic control system for vehicles in accordance with the embodiment of the present invention.

FIG. 6(a) illustrates the state of the diffuser prior to operation, and FIG. 6(b) illustrates the state of the diffuser after operation.

Figure 7A:
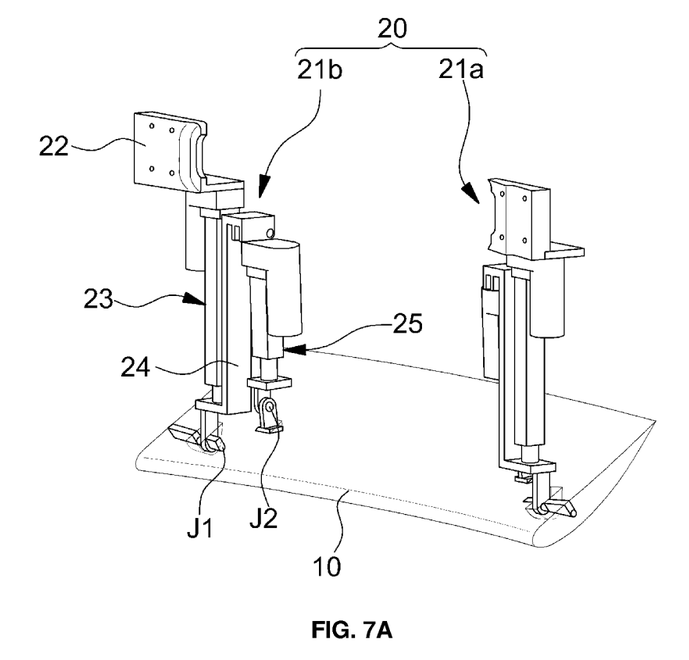
Figure 7B:
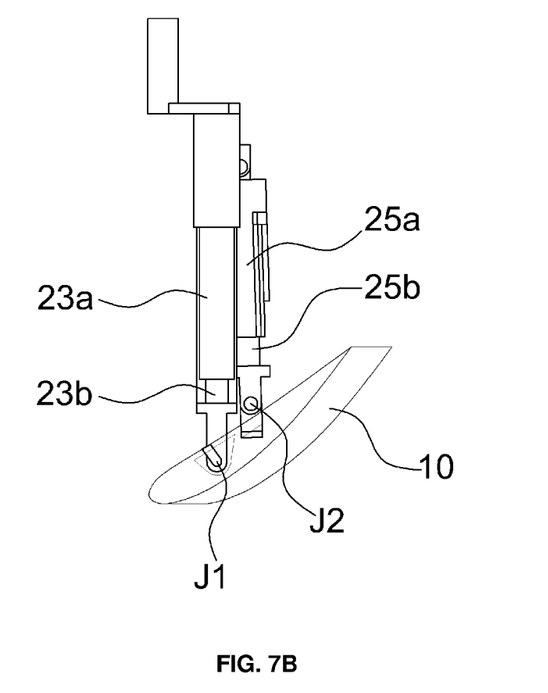
Figure 7C:
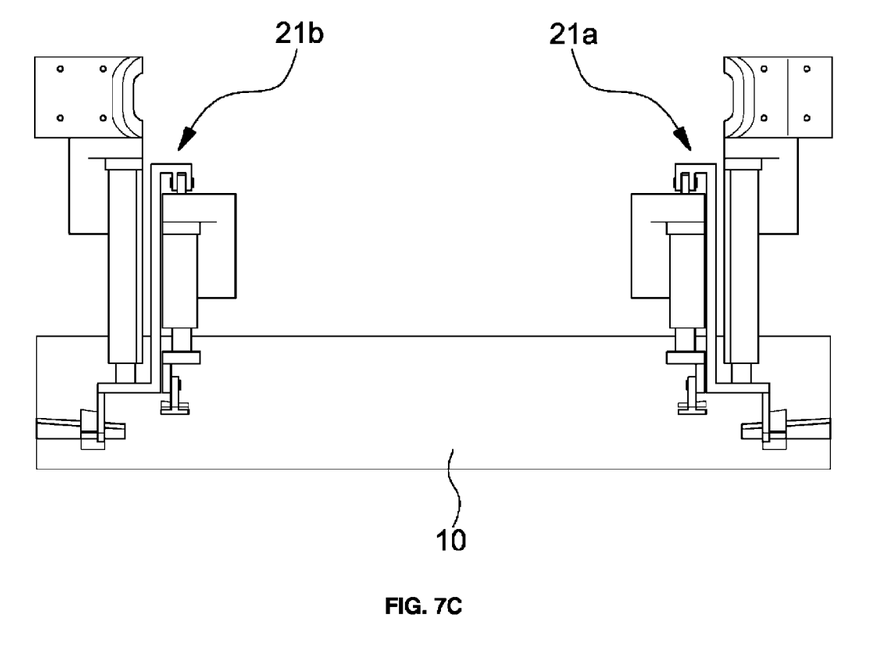
Figure 8A:
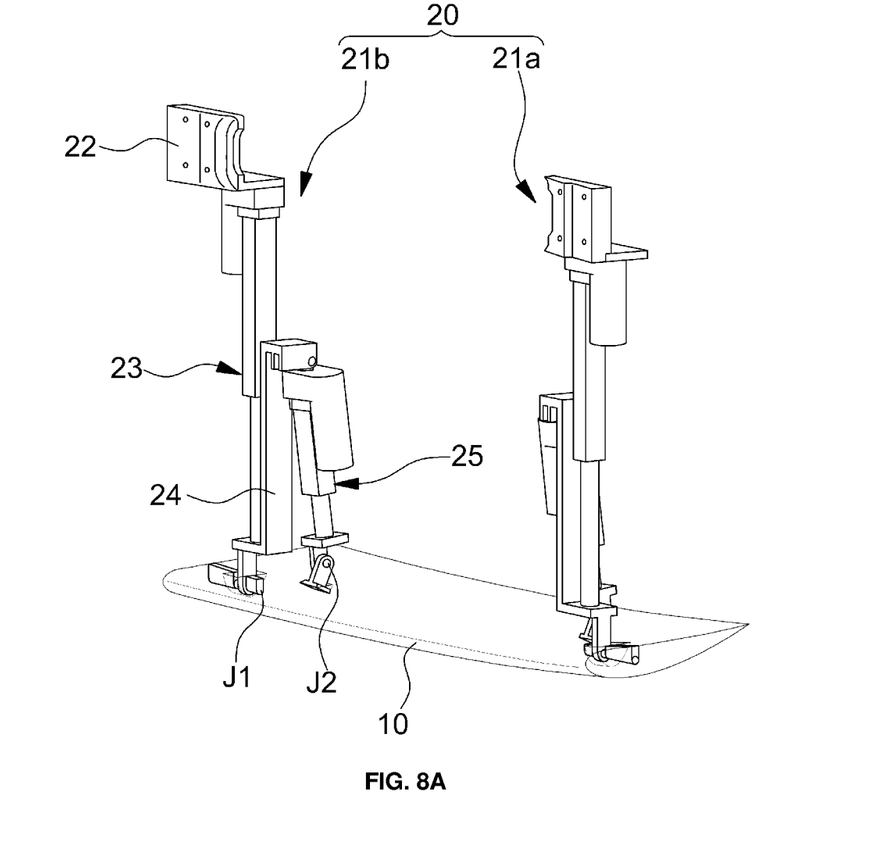
Figure 8B:
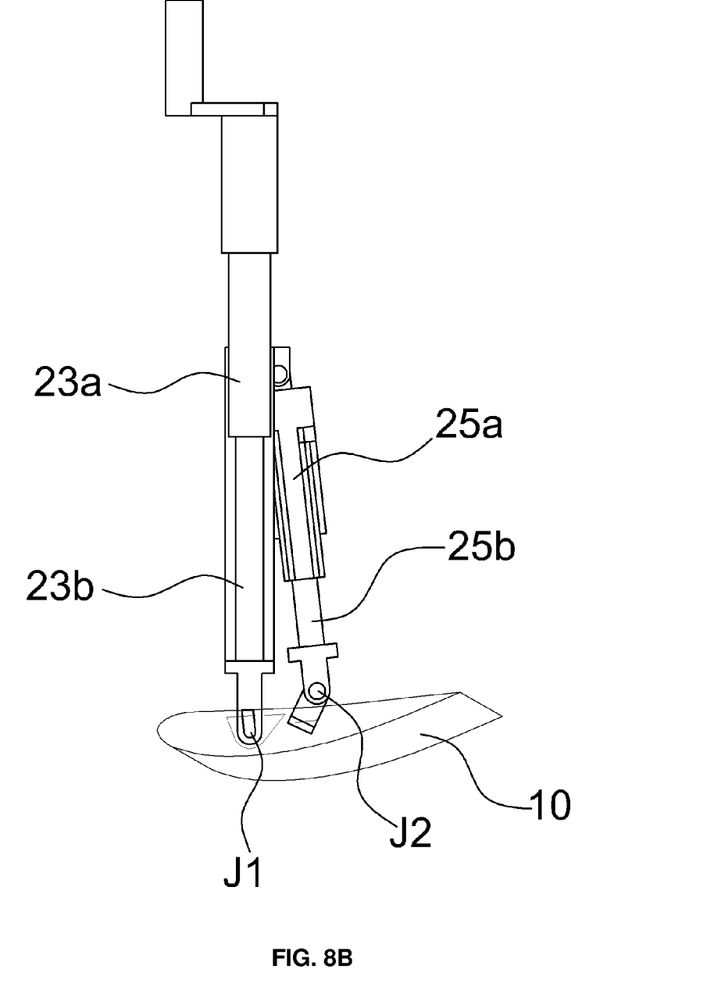
Figure 8C:
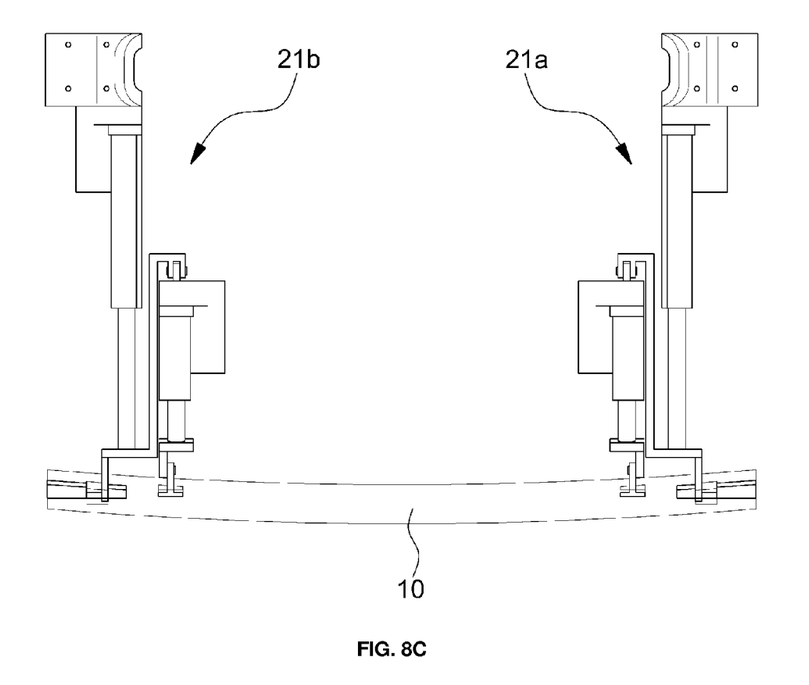

Further, FIGS. 7(a) to 8(c) are views illustrating the operating state of the aerodynamic control system for vehicles in accordance with the embodiment of the present invention. FIGS. 7(a) to 7(c) are views illustrating the state of the diffuser prior to operation when the vehicle is stopped or generally travels (at a low speed, which is a reference speed or lower, or a medium speed) and FIGS. 8(a) to 8(c) are views illustrating the state of the diffuser after operation when the vehicle travels at a high speed (exceeding the reference speed).

In these figures, the state of the diffuser prior to operation refers to a state in which the diffuser 10 maximally ascends and forms part of the bumper surface of the rear bumper 1 and, in this state, the outer surface of the bumper cover and the outer surface of the diffuser 10 form one bumper surface.

Further, in these figures, the state of the diffuser after operation refers to a state in which the dual cylinder devices 21a and 21b of the diffuser driving unit 20 are operated so that the diffuser 10 descends to a predetermined height and is controlled to a predetermined angle and, in the high speed condition in which the diffuser 10 is operated, the height (i.e., the vertical position and descending amount) and angle of the diffuser 10 may be differentially controlled by a controller (not shown) according to vehicle speed.

In FIG. 5, the dual cylinder devices 21a, 21b connecting the vehicle frame panel 3 located at the front region and the diffuser 10 located at the rear region and supporting and operating the diffuser 10 on the vehicle frame panel 3 is illustrated, but a rear bumper is omitted.

In the assembled state of the dual cylinder devices 21a, 21b with the vehicle frame panel 3, as exemplarily shown in FIG. 5, the rear bumper may be formed by mounting a bumper back beam on the vehicle frame panel 3 so as to be located in the rear of the dual cylinder devices 21a, 21b and then assembling a bumper cover with the bumper back beam.

Each of the dual cylinder devices 21a, 21b includes two cylinder units, i.e., a first cylinder unit 23 to raise and lower the diffuser 10 and a second cylinder unit 25 to adjust the angle of the diffuser 10.

In more detail, the diffuser driving unit 20 includes one dual cylinder device or a plurality of dual cylinder devices 21a and 21b, which are disposed between the vehicle frame panel 3 and the diffuser 10, supports the diffuser 10 on the vehicle frame panel 3, raises and lowers the diffuser 10, and rotates the diffuser 10 to control the angle thereof.

With reference to FIG. 5, in order to raise and lower the diffuser 10 and to control the angle of the diffuser 10, cylinder devices 21a and 21b are mounted on the left side and right side of the diffuser 10, respectively, and the diffuser driving unit 20 may include a plurality of dual cylinder devices 21a and 21b disposed in the length direction of the rear bumper 1, i.e., in the length direction of the diffuser 10.

The number of the dual cylinder devices 21a, 21b constituting the diffuser driving unit 20 may be variously modified as long as they may stably support the diffuser 10, smoothly raise and lower the diffuser 10 and adjust the angle of the diffuser 10.

A plurality of dual cylinder devices, for example, two dual cylinder devices 21a and 21b, disposed in the length direction of the diffuser 10 may be installed in consideration of the shape of the diffuser 10.

Each of the dual cylinder devices 21a and 21b are installed in each of the mounting parts 22 fixed to the vehicle frame panel 3, a first cylinder unit 23 installed on the mounting parts 22 and controlling ascent and descent of the diffuser 10, a second cylinder unit 25 rotating the diffuser 10 to control the angle of the diffuser 10, and a cylinder strut 24 connecting a piston rod 23b of the first cylinder unit 23 to the second cylinder unit 25.

The mounting parts 22 may be fixed to the vehicle frame panel 3 by bolting or welding, and the dual cylinder devices 21a and 21b are installed in each of the mounting parts 22.

The first cylinder unit 23 and the second cylinder unit 25 may respectively have piston rods 23b and 25b which move forwards and backwards in cylinder bodies 23a and 25a. The first cylinder unit 23 and the second cylinder unit 25 may be hydraulic or pneumatic cylinders.

The first cylinder unit 23 is installed on vehicle frame panel 3 via the mounting part 22 so as to be vertically extended, and thus the piston rod 23b of the first cylinder unit 23 moves forwards and backwards in the cylinder main body 23a in the vertical direction.

Here, the cylinder main body 23a of the first cylinder unit 23 is fixed to the mounting part 22 and the cylinder strut 24 is fixed to the front end of the piston rod 23b of the first cylinder unit 23.

The cylinder main body 25a of the second cylinder unit 25 is hinged to the upper end of the cylinder strut 24.

The second cylinder unit 25 is installed on the cylinder strut 24 so as to be vertically extended, the upper end of the cylinder main body 25a is hinged to the upper end of the cylinder strut 24, and the front end of the piston rod 25b is hinged to the diffuser 10.

Here, the piston rod 25b of the second cylinder unit 25 moves forwards and backwards in the cylinder main body 25a approximately in the vertical direction.

Further, the lower end of the cylinder strut 24 is also hinged to the diffuser 10.

The second cylinder unit 25 may be installed in a more inclined direction, as compared to the first cylinder unit 23, and a hinge point part J2 between the piston rod 25b of the second cylinder unit 25 and the diffuser 10 may be set to be located at a rear position, as compared to a hinge joint part J1 between the cylinder strut 24 and the diffuser 10.

Accordingly, when the first cylinder unit 23 is operated by a control signal from the controller, as exemplarily shown in FIGS. 6(a) to 8(c), the piston rod 23b moves forwards and backwards, and the diffuser 10 connected to the front end of the piston rod 23b of the first cylinder unit 23 via the cylinder strut 24 moves upwards and downwards.

That is, the diffuser 10 ascends or descends, and thus the vertical position (height) of the diffuser 10 is controlled.

Here, if the piston rod 23b moves forwards, the diffuser 10 descends from the rear bumper and, if the piston rod 23b moves backwards, the diffuser 10 ascends towards the rear bumper.

In the state prior to operation of the diffuser 10, the diffuser 10 ascends so as to form the bumper surface together with the bumper cover of the rear bumper (the state shown in FIG. 6(a) and FIGS. 7(a) to 7(c)) and, when the diffuser 10 is operated, the first cylinder unit 23 is operated and the diffuser 10 descends (the state shown in FIG. 6(b) and FIGS. 8(a) to 8(c)).

Further, when the second cylinder unit 25 together with the first cylinder unit 23 is operated by a control signal from the controller, the piston rod 25b moves forwards and backwards, the cylinder main body 25a of the second cylinder unit 25 is rotated about the hinge joint part J1 of the cylinder strut 24 and, simultaneously, the diffuser 10 is rotated about the hinge joint part J2 of the piston rod 25b of the second cylinder unit 25. Accordingly, the angle of the diffuser 10 is adjusted.

If the piston rod 25b of the second cylinder unit 25 moves forwards, the diffuser 10 is rotated in a direction of laying down backwards and thus the angle of the diffuser 10 is adjusted (with reference to FIGS. 8(a) to 8(c)) and, thereafter, if the piston rod 25b of the second cylinder unit 25 moves backwards, the diffuser 10 is rotated in a standing direction and thus the angle of the diffusion 10 is adjusted (with reference to FIGS. 7(a) to 7(c)).

Further, in the state prior to operation of the diffuser 10, the diffuser 10 stands so as to form the bumper surface together with the bumper cover (the state shown in FIG. 6(a) and FIGS. 7(a) to 7(c)) and, when the diffuser 10 descends by the first cylinder unit 23 and then the second cylinder unit 25 is operated to adjust the angle of the diffuser 10, the diffuser 10 is rotated so as to lay down backwards and thus the angle of the diffuser 10 is adjusted (the state shown in FIG. 6(b) and FIGS. 8(a) to 8(c)).

The first cylinder unit 23 and the second cylinder unit 25 may be controlled by the controller so as to be sequentially operated. For example, the controller may be set to firstly operate the first cylinder unit 23 and then to operate the second cylinder unit 25.

Further, when the controller receives the current driving speed of the vehicle from a vehicle speed detection unit, the controller controls operation of the diffuser driving unit 20 including the dual cylinder devices 21a and 21b according to the vehicle speed, thereby adjusting the vertical position and angle of the diffuser 10.

As described above, the aerodynamic control system for vehicles in accordance with the present invention may operate the diffuser, integrated with the rear bumper and forming the bumper surface, according to the driving state of the vehicle, and thus optimally control an air flow diffusion angle and a flow exhaust amount to the rear part of the vehicle.

Accordingly, air resistance of the vehicle may be reduced and enhancement in fuel efficiency of the vehicle due to reduction of air resistance and lowering of a drag coefficient may be achieved.

Further, when the diffuser is operated, lift balance improvement effects may be acquired. Instead of a negative balance state (an unstable driving state) in which a rear wheel lift is greater than a front wheel lift, a positive balance state in which a rear wheel lift is lowered, as compared to a front wheel lift, so that the vehicle may be stably driven.

The lift coefficient of the rear wheels is decreased and the down force of the rear wheels is increased, thereby achieving aerodynamic balance improvement effects.

Further, if the aerodynamic control system for vehicles in accordance with the present invention is applied to a vehicle, the vehicle may lower a lift (reduce a lift coefficient) in the same cross wind conditions, as compared to a vehicle to which the aerodynamic control system is not applied, and improve front and rear wheel balance and a pitching moment, thereby improving driving stability.

For example, in accordance with the present invention, aerodynamic improvement effects in which both the drag and the lift of the vehicle are improved may be acquired.

Further, the dual cylinder devices may be assembled with the vehicle frame panel simply by bolts and thus the aerodynamic control system for vehicles in accordance with the present invention may be easily assembled and modularized, and the aerodynamic control system for vehicles may be mounted in a space between the vehicle frame panel and the bumper back beam and thus a separate space is not required.

Moreover, since the position of the diffuser is controlled and an air flow angle and a flow rate are adjusted by translational motion of the diffuser using the cylinder devices, the aerodynamic control system for vehicles in accordance with the present invention has excellent durability and robustness, as compared to a conventional diffuser hinged directly to a vehicle frame or a rear bumper so that an air flow angle and a flow rate are controlled simply by rotation of the diffuser.

As is apparent from the above description, in an aerodynamic control system for vehicles in accordance with the present invention, a diffuser forms a bumper surface of a rear bumper prior to operation of the diffuser and thus deterioration of the design and external appearance of a vehicle are prevented, and it is not required to unnecessarily increase the ground clearance of the lower end of the rear bumper, and thus an increase in the visible amount of the lower part of the vehicle and deterioration of the commercial value of the vehicle are prevented.

Further, since the diffuser is used as a bumper member to constitute part of the bumper surface of the rear bumper and used as a device to control the wake of the vehicle, using the diffuser has advantages, such as reduction of weight and production costs, as compared to using a separate under cover.

Further, since the diffuser forming part of the bumper surface of the rear bumper is not hinged directly to the rear bumper or a vehicle frame panel so as to be rotatable but is installed as an operating member independently of the rear bumper and the vehicle frame panel so as to be vertically movable and controllable in terms of angle, the diffuser may assure a wide range of position and angle control. Moreover, since air introduced into the lower part of the vehicle frame passes through the upper and lower surfaces of the diffuser, flow diffusion with respect to flux passing through the diffuser is increased (excellent aerodynamic performance improvement effects).

Further, the aerodynamic control system for vehicles in accordance with the present invention provides aerodynamic improvement effects in which both the drag and the lift of the vehicle are improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An aerodynamic control system for a vehicle, comprising:
a diffuser being a panel-shaped member configured so as to be completely separated from or combined with a rear bumper of the vehicle, combined with the rear bumper at an ascending position so as to constitute part of a bumper surface of the rear bumper, and separated from the rear bumper at a descending position so as to pass air introduced into a lower part of a vehicle frame through upper and lower surfaces of the diffuser; and
a diffuser driving unit configured so as to connect the vehicle frame panel to the diffuser, supporting the diffuser on the vehicle frame panel, and adjusting a vertical position of the diffuser and an angle of the diffuser,
wherein the diffuser driving unit includes a dual cylinder device disposed between the vehicle frame panel and the diffuser, comprising a first cylinder unit configured to move the diffuser vertically and a second cylinder unit configured to rotate the diffuser so as to adjust the angle of the diffuser.

2. The aerodynamic control system of claim 1, wherein the diffuser has a long panel shape extended leftwards and rightwards in the length direction of the rear bumper.

3. The aerodynamic control system of claim 1, wherein the diffuser is a panel-shaped member combined with the rear bumper at the ascending position so as to form the lower surface of the rear bumper.

4. The aerodynamic control system of claim 1, wherein the dual cylinder device includes:
the first cylinder unit including a cylinder main body mounted on the vehicle frame panel so as to be fixed to the vehicle frame panel and a piston rod moving forwards and backwards in a vertical direction;
a cylinder strut connected to the piston rod of the first cylinder unit and hinged to the diffuser; and
the second cylinder unit including a cylinder main body hinged to the cylinder strut and a piston rod moving forwards and backwards and hinged to the diffuser.

5. The aerodynamic control system of claim 4, wherein the dual cylinder device further includes a mounting part fixed to the vehicle frame panel and to which the cylinder main body of the first cylinder unit is fixed.

6. The aerodynamic control system of claim 4, wherein, in the second cylinder unit, the piston rod moves forwards and backwards in the vertical direction in the cylinder main body, and a hinge joint part between the piston rod of the second cylinder unit and the diffuser is located at a rear position, as compared to a hinge joint part between the cylinder strut and the diffuser.

7. The aerodynamic control system of claim 1, wherein:
the diffuser has a long panel shape disposed in the length direction of the rear bumper; and
the diffuser driving unit includes a plurality of dual cylinder devices disposed in the length direction of the diffuser.

8. The aerodynamic control system of claim 7, wherein two dual cylinder devices are disposed in the length direction of the diffuser.

9. The aerodynamic control system of claim 1, wherein the dual cylinder device is disposed in a space between the vehicle frame panel and a back beam of the rear bumper.

10. The aerodynamic control system of claim 1, wherein the diffuser is rotated in a standing direction or rotated in a direction of laying down in the backward direction of the vehicle so that the angle of the diffuser is adjusted.

11. The aerodynamic control system of claim 1, further comprising a controller configured to output a signal to control operation of the diffuser driving unit according to the speed of the vehicle, wherein the controller is set:
to output a control signal to raise the diffuser so as to form part of the bumper surface of the rear bumper, if the vehicle speed is a reference speed or lower; and
to output a control signal to lower the diffuser and to adjust the angle of the diffuser, if the vehicle speed exceeds the reference speed.

* * * * *